Feb. 24, 1959  D. W. KING  2,874,860
HAND TRUCK FOR HANDLING EQUIPMENT
Filed June 10, 1946  2 Sheets-Sheet 1

INVENTOR.
David W. King
BY
Robert A. Lavender

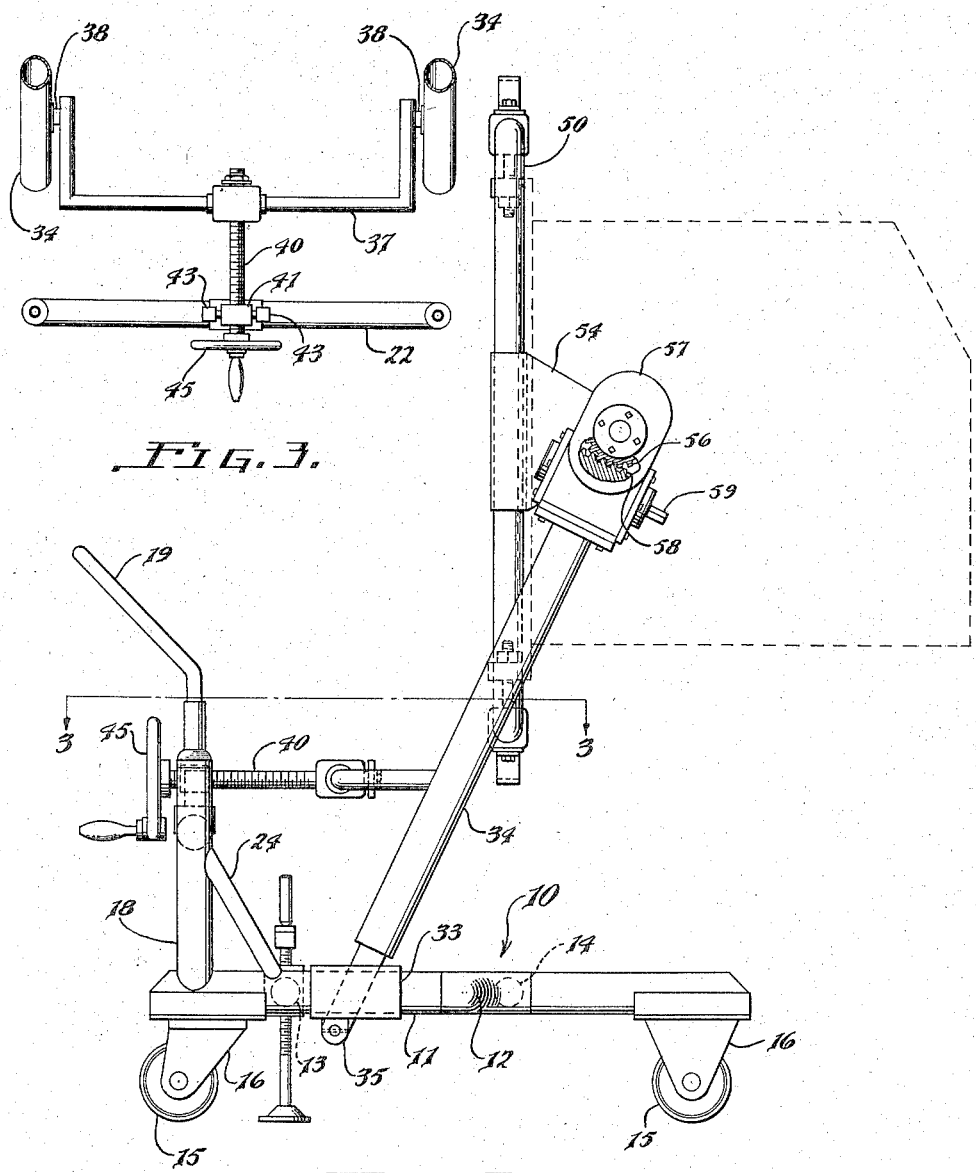

2,874,860

HAND TRUCK FOR HANDLING EQUIPMENT

David W. King, Knoxville, Tenn., assignor, by mesne assignments, to the United States of America as represented by the United States Atomic Energy Commission Application June 10, 1946, Serial No. 675,627

1 Claim. (Cl. 214—130)

This invention relates to a handling truck or dolly for the handling of large and relatively heavy pieces of equipment and particularly for handling of ion source units for use in calutrons. A calutron is in general a device or system for the electromagnetic separation of isotopes of a material as disclosed in detail in the earlier application of Ernest O. Lawrence, Ser. No. 557,784, now Patent No. 2,709,222, issued May 24, 1955. The handling of the ion source unit requires a relatively sturdy piece of equipment since the ion source unit is relatively heavy and certain of its parts are rather delicate requiring careful handling and since the ion source unit itself fits into the calutron with rather small tolerances, the handling equipment must be capable of meeting more or less extraordinary requirements. It is a further requirement that the ion source unit can with facility be moved or adjusted into any desired position to enable maintenance personnel to work on it.

It is the object of my invention to provide a handling truck particularly for the purpose of meeting the above requirements for handling ion source units, or like apparatus.

A more particular object of my invention is to provide a handling truck comprising a chassis and having a frame pivoted to the chassis so as to be operable to swing in the manner of a boom and the frame having spaced members with means arranged therebetween adapted to have the material to be handled attached thereto.

Another object of the invention is to provide a truck as in the preceding object wherein the frame to which the material to be handled is attached is rotatable between the spaced members of the frame.

A further object of the invention is to provide a truck as in the preceding objects wherein the frame to which the material to be handled is attached itself comprises spaced members so arranged that the material or device to be handled can be suspended between or passed between these spaced members.

Referring to the drawing,

Fig. 2 is a side view of the handling truck.

Fig. 3 is a plan view of a detail taken along line 3—3 of Fig. 2.

Figure 1:
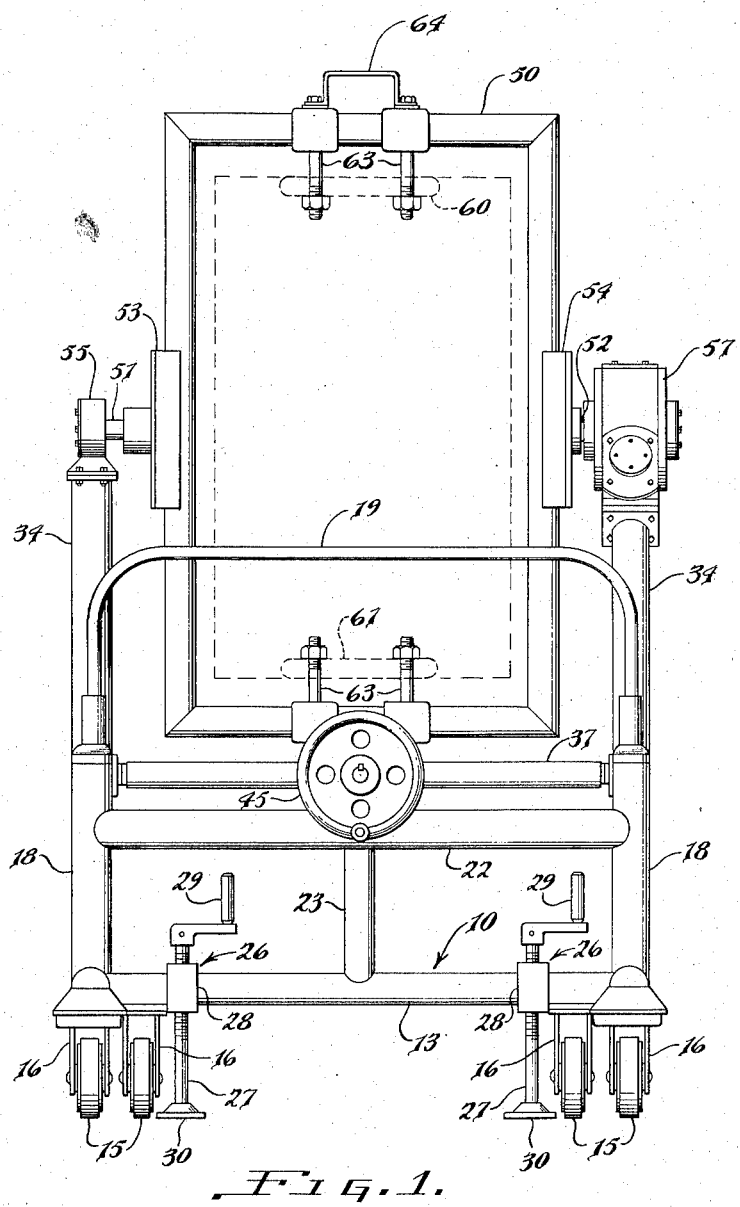
Fig. 1 is an end view of the handling truck.

Referring to the drawings, on Figures 1 and 2, numeral 10 refers to the main horizontal portion, that is, the chassis of the handling truck. The truck has longitudinal members 11 (see Fig. 2) which have shoulders formed therein as at 12, the truck being narrower at the front than at the back. The longitudinal members 11 are connected by transverse member 13 (see Fig. 1) and a second transverse member 14 (see Fig. 2). The chassis is supported on four caster wheels as shown at 15, the caster wheels being journalled on shafts which bridge the arms of caster wheel support brackets 16 that extend downwardly from the chassis frame. The front caster wheels are closer together than the rear wheels, the chassis being narrower at the front than at the back as described above.

At the back of the truck frame are two vertical uprights 18 on opposite sides of the truck which are of tubular steel construction, the entire truck being in the main fabricated from tubular steel elements welded together. The upper ends of the uprights 18 are made smaller in diameter and inserted into these upper ends are inserted the arms of an inverted U-shaped pushing handle 19. The uprights 18 are connected by a transverse member 22, and a vertical member 23 extends between member 22 and member 13. The uprights 18 are braced from the horizontal part of the chassis by brace members as shown at 24 (see Fig. 2).

The rear part of the truck may be lifted off the floor and stabilized by means of screw jacks, as shown at 26. They comprise vertical screw threaded stems 27 extended through screw blocks 28 attached to the cross member 13 and rotatable by cranks 29. At the lower end of the stems 27 are flat shoes or foot portions 30 adapted to rest on the floor.

The longitudinal members 11, near the back part of the truck have rectilinear portions 33 as may be seen on Fig. 2 which have formed in them a vertical slot and extending through the slots are the lower portions of spaced members 34 which are pivoted to the frame or chassis of the truck to lugs as may be seen at 35. The spaced members 34 are parallel and they are connected intermediate of their ends by a yoke as shown at 37 in Fig. 3, the arms of which have trunnions 38 journalled in bearings formed in parallel spaced members 34 as shown on Fig. 3. Projecting through the central portion of the yoke 37 is a screw threaded stem 40 which is attached to the yoke by a nut and washer as shown. The stem 40 also passes through a swivel mounted screw block 41 carried by a cross member 22 extending between the uprights 18 as shown on Fig. 3. The block 41 is rotatably mounted between supports 43 attached to the cross member 22. The end of the stem 40 beyond the block 41 carries a hand wheel 45. It will be observed that by rotating the hand wheel 45 the stem 40, by reason of its engagement of screw block 41 is translated to the left, looking at Fig. 2, which exerts a pull on the yoke 37 and in turn swings the structure formed of the spaced parallel members 34 to the left; in other words the members 34 can be swung on their pivots by rotating the hand wheel 45.

Disposed in a position between the spaced members 34 is a rectangular frame structure 50 comprising a welded steel pipe structure and this frame structure is rotatably supported on trunnions 51 and 52 extending outwardly from trunnion brackets 53 and 54 attached to the sides of the frame 50. The trunnion 51 engages in a bearing within a housing 55 carried in the upper end of the left spaced member 34, looking at Fig. 1. The trunnion 52 has a gear 56 mounted thereon, this gear being within a housing 57 and it engages with a worm gear 58 also inclosed within the housing and rotatable by a square ended shaft 59 which may have a wrench or crank attached thereto for rotating the shaft. The worm 58 and gear or worm wheel 56 form a reduction gear train whereby the trunnion 52 can be rotated so as to rotate the frame 50 about a horizontal axis between the spaced members 34.

From the foregoing it will be seen that the spaced members 34, by means of the hand wheel 45 can be swung on their pivots to any of various angular positions relative to the chassis of the truck, the members 34 being permitted to assume various angular positions relative to the stem 40 by reason of the fact that the yoke 37 is attached to the members 34 by the trunnions 38 permitting relative rotational movement and the stem 40 can move angularly relative to the cross member 22 by reason of the swivel mounting of the screw block 41.

The material being handled by the truck is shown in outline on Figs. 1 and 2 and this may be the ion source of a calutron. Ordinarily the ion source unit embodies a face plate which is represented by the rectangle in broken lines in Fig. 1, and the face plate normally has attached thereto support brackets as shown at 60 and 61. These brackets have vertical spaced holes in them into which fit bolts 63 forming part of an attaching handle 64 which is simply a U-shaped member having the bolts 63 attached thereto so that the bolts can be slipped through suitable receiving openings in the transverse portions of frame 50 and then through the openings in the brackets 60 and 61 so as to receive nuts on their ends beyond the openings.

It will be observed from Figs. 1 and 2 that by reason of the arrangement of the parts of the truck, the ion source unit can be gotten into any desired position either as respects height above the floor, as respects fore and aft movement, or as respects rotated position of the ion source unit. In other words, by rotating the shaft 59, the frame 50 and the ion source unit can be rotated into any convenient angular position and the unit can be moved fore and aft of the truck or up and down by turning the hand wheel 45 and swinging the spaced members 34 to the desired position. Thus, the unit can be gotten into any desired position to be worked on and furthermore, when transferring the ion source unit from one position to another, it can be passed entirely through the frame 50 if desired, that is, if the unit is removed from a calutron with the truck pushed up to the front of the calutron, the parts being generally in the position of Fig. 3, the unit can be transferred to a stationary mounting frame and attached thereto by swinging the members 34 all the way to the left and bringing the face plate of the ion source unit up to the stationary mounting frame, with the handle 19 removed, and then withdrawing the truck to the right with the ion source unit passing through the frame 50.

From the foregoing, those skilled in the art will observe that I have provided a very efficient and adaptable handling truck for handling heavy and delicate pieces of apparatus and this truck is ideally suited to the handling of such articles as ion source units of calutrons.

The embodiment of my invention herein is representative of its preferred form. The disclosure is to be interpreted in an illustrative rather than a limiting sense, the scope of the invention being determined in accordance with the claim appended hereto.

I claim:

In a handling truck, in combination, a wheeled chassis, a vertically swingable boom structure having side arms spaced from each other and pivotally attached to the chassis, a rectangular frame having its side members rotatably supported substantially at their mid-points between said side arms and having means for attaching an article to be handled to its top and bottom members, a gear train carried by one of said side arms whereby said frame may be rotated on its mountings, a yoke member adjustably attached to the side arms of said boom structure, and a rotatable screw threaded stem connected between said yoke member and a part of said chassis so that by rotation of said stem the boom structure may be swung on its pivots.

References Cited in the file of this patent

UNITED STATES PATENTS

| | | |
|---|---|---|
| 2,224,901 | Cunningham | Dec. 17, 1940 |
| 2,379,587 | Moore | July 3, 1945 |
| 2,418,299 | Gorsuch | Apr. 1, 1947 |

FOREIGN PATENTS

| | | |
|---|---|---|
| 76,736 | Austria | Sept. 1, 1915 |